UNITED STATES PATENT OFFICE.

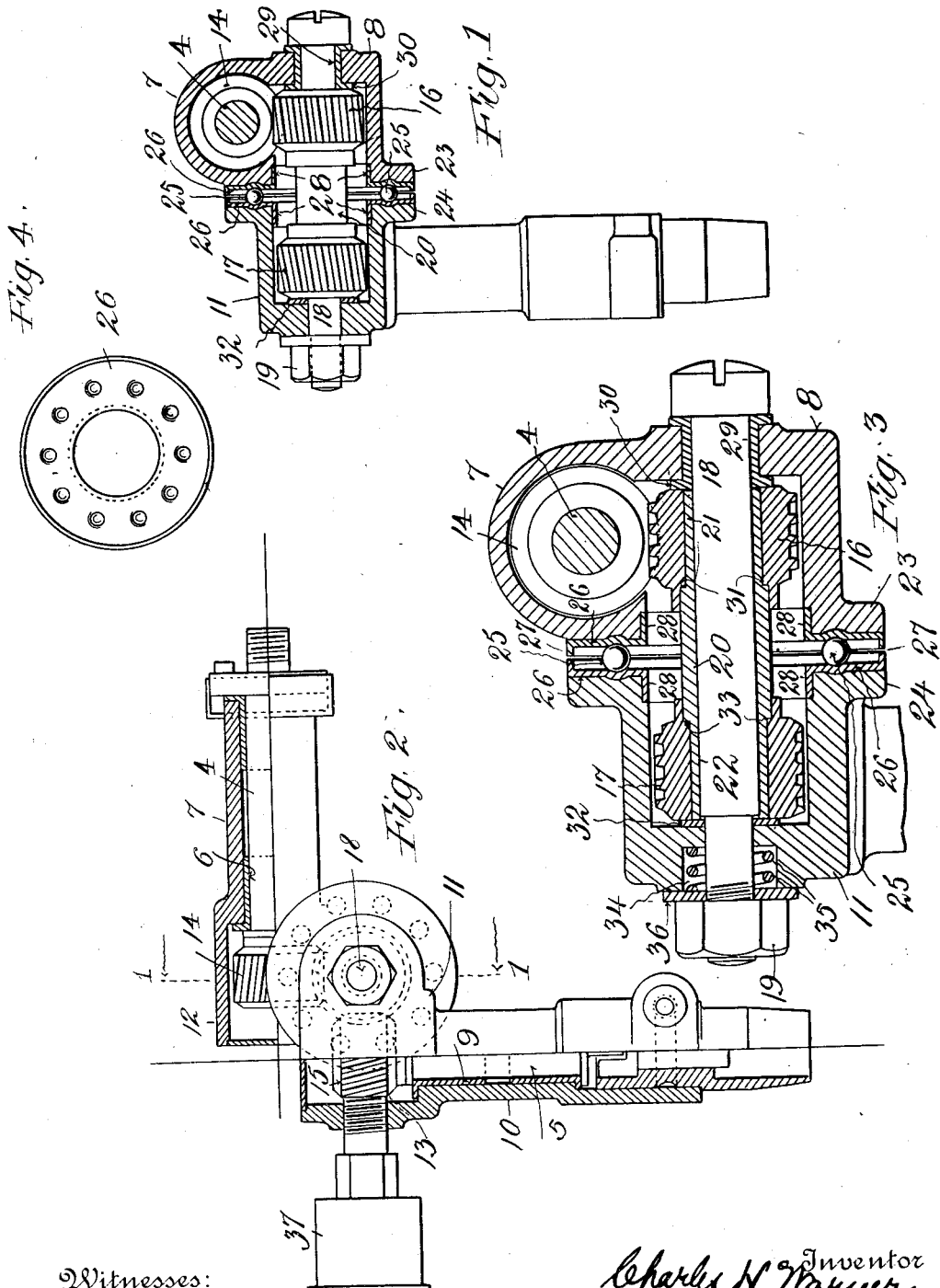

CHARLES H. WARNER, OF BELOIT, WISCONSIN, ASSIGNOR, BY MESNE ASSIGNMENTS, TO STEWART-WARNER SPEEDOMETER CORPORATION, A CORPORATION OF VIRGINIA.

SPIRAL-GEAR POWER-TRANSMITTING DEVICE.

1,088,947. Specification of Letters Patent. Patented Mar. 3, 1914.

Application filed March 10, 1910. Serial No. 548,481.

*To all whom it may concern:*

Be it known that I, CHARLES H. WARNER, a citizen of the United States, residing at Beloit, county of Rock, State of Wisconsin, have made a certain new and useful Invention in Spiral-Gear Power-Transmitting Devices, of which the following is a specification.

This invention relates to spiral gear power transmitting devices.

The object of the invention is to provide a simple, compact, durable and efficient spiral gear power transmitting device, whereby power may be positively transmitted from one rotating shaft to another, while at the same time permitting a swiveling action of one of said shafts relatively to the other without deranging or interfering with the operation or the action of the drive gearing.

A further object of the invention is to provide a construction of device of the character referred to which is economical to manufacture and wherein friction is reduced to a minimum.

Other objects of the invention will appear more fully hereinafter.

The invention consists substantially in the construction, combination, location and arrangement of parts, all as will be more fully hereinafter set forth, as shown in the accompanying drawing, and finally pointed out in the appended claims.

Referring to the accompanying drawing, and to the various views and reference signs appearing thereon, Figure 1 is a view in section on the line 1, 1, Fig. 2, looking in the direction of the arrows. Fig. 2 is a view partly in elevation and partly in section showing the relation of the driving and driven shafts and intermediate spiral gear shaft. Fig. 3 is a view similar to Fig. 1, showing a slightly modified arrangement embraced within the spirit and scope of my invention. Fig. 4 is a detail view of the bearing ball retaining cup section.

The same part is designated by the same reference sign wherever it occurs throughout the several views.

Reference signs 4 and 5 designate the shafts, one of which is the driving and the other the driven shaft. For convenience of description I will refer to shaft 4 as the driving shaft, and to shaft 5 as the driven shaft. The driving shaft 4 is journaled within a sleeve 6, mounted in a casing 7, formed as a lateral extension of the cap member 8, of the swivel casing of the device. Similarly the driven shaft 5 is journaled in a sleeve 9 mounted in a casing 10, formed as a lateral extension of the cap member 11, of the swivel casing of the device. Each of the shaft casings 7, 10, is provided with an enlarged portion 12, 13, respectively, to accommodate and inclose a spiral pinion 14, 15, respectively carried on the proximate ends of the shafts 4 and 5. These spiral pinions 14, 15, respectively mesh with spiral gears 16, 17, respectively arranged within the cap members 8, 11, of the swivel casing. The two members 8, 11, of the swivel casing are held together by means of a headed bolt 18, passing through the longitudinal axis of said casing members. A nut 19 on the threaded end of the bolt 18 serves to clamp the cap sections 8, 11, together. Mounted to revolve upon the bolt 18 is a sleeve 20 having reduced portions 21, 22 at the respective ends thereof to form bearings to receive the spiral drive gears 16, 17, respectively. These drive gears are designed to fit tightly upon the reduced portions of the sleeve 20 so that rotation imparted to one of said drive gears is transmitted through said sleeve to the other of said drive gears. The meeting faces of the cap members 8, 11, of the swivel casing are provided with laterally extending annular flanges 23, 24, to form flat bearing surfaces presented toward each other. Interposed between these bearing surfaces is a raceway to receive antifriction bearing balls 25. A simple and efficient construction of antifriction bearing ball arrangement for the purposes of my invention is shown wherein I face each of the flanges 23, 24, with a retaining and wearing plate 26, of suitable material. In the particular form shown the wearing plates 26 are provided with peripheral flanges 27, 28, the flanges 28 fitting within the bores, respectively, of the cap members 8, 11 of the swivel casing while the outer peripheral flanges 27, of said wearing plates are presented toward each other. These wearing plates may be of any suitable or desired material and they afford a simple and convenient raceway for the bearing balls 25. If desired a wearing bushing 29, may be inserted through the end opening of cap member 8, through which the headed bolt 18 extends. The one end of this bushing is flanged as at 30 to form an abutment for the adjacent end of the spiral drive gear 16, said spiral drive gear being held between said abutment and a shoulder 31 formed on the sleeve 21. Similarly a washer 32 may form a wearing abutment for the end of spiral drive gear 17, said spiral drive gear being held between said washer 32 and a shoulder 33 formed on the sleeve 31. If desired and in order to secure a resilient bearing of the two cap members 8, 11, of the casing upon or toward each other, a chamber 34 may be formed in one of said casing members as 11, for instance (see Fig. 3) to receive a spring 35, the tension of which is exerted between the casing and a collar 36 on the bolt 18 thereby imposing a yielding tension upon the clamping action of the nut of said bolt, and hence yieldingly maintaining the cap sections 8, 11, clamped toward or upon each other.

From the foregoing description it will be seen that I provide an exceedingly simple spiral gear drive connection intermediate the shafts 4 and 5, and wherein the sections 8 and 11 are permitted relative axial rotative movement with respect to each other without deranging or interfering with the proper driving mesh of the pinions constituting the drive gear connections. It will also be seen that the structure is compact, the parts required are few and simple, easily constructed and readily assembled, while at the same time they are strong and durable.

If desired and in order to efficiently lubricate the gearing a lubricant may be readily introduced in any convenient manner into the casing. I have shown an arrangement 37 for accomplishing this purpose.

While a spiral gear power transmitting device embodying the principles of my invention is well adapted for many uses and purposes where a swiveling action of the gear connections is required, the arrangement is especially designed, intended and adapted for use as a drive gearing for automobile speed indicating or similar devices, where it is customary to drive such device from one of the wheels of the automobile. Ordinarily such devices are driven from the front or steering wheel of the machine, instead of the rear or power driven wheels, thereby avoiding inaccuracies due to slippage or braking of the power driven wheels. The indicating or other instrument to be driven is usually mounted upon the dash board or other convenient fixed part of the vehicle and is connected by or through a flexible or other shaft to the drive gear connection which is driven by or from the front or steering wheel of the machine. The front or steering wheel of the machine is rocked or swung in order to effect the steering of the machine and a swivel drive gear connection embodying the principles of my invention readily permits this swinging movement of the steering wheel without imparting an undue bending or flexing of the flexible or other drive shaft connection of the instrument to be driven.

It is obvious that many variations and changes in the details of construction and arrangement might readily occur to persons skilled in the art and still fall within the spirit and scope of my invention. I do not desire therefore to be limited or restricted to the exact and specific details shown and described. But Having now set forth the object and nature of my invention and various constructions embodying the principles thereof, what I claim as new and useful and of my own invention, and desire to secure by Letters Patent is,—

1. A power transmitting device consisting of the driving and driven shafts, a spiral pinion mounted on each shaft, gear casing members inclosing said pinions, a bolt for clamping said gear casing members together, the axis of said bolt being disposed in angular relation with respect to the axes of said shafts, a sleeve journaled to rotate upon said bolt, drive gears carried by said sleeve and respectively meshing with said pinions, said gear casing members having oppositely-faced laterally-extending annular flanges and ball bearings interposed between the meeting faces of said flanges.

2. A power transmitting device consisting of the driving and driven shafts, a pinion carried by each of said shafts, gear casing members having lateral extensions inclosing said pinions, a bolt for clamping said gear casing members together, a sleeve journaled on said bolt and having reduced ends extending respectively into said gear casing members, a drive gear mounted upon each of the reduced ends of said sleeve, said drive gears respectively meshing with said pinions, and an anti-friction device interposed between the meeting faces of said gear casing members.

3. A power transmitting device consisting of the driving and driven shafts, a pinion carried by each of said shafts, casing members having lateral extensions inclosing said pinions, a bolt extending axially through said casing members to clamp the same together, a sleeve journaled on said bolt, and having its ends respectively extending into said casing members, a drive gear mounted on each end of said sleeve, said drive gears respectively meshing with said pinions, said casing members having laterally extending annular flanges on their meeting edges, wearing plates applied to the meeting faces of said flanges, and anti-friction balls interposed between said wearing plates.

4. A power transmitting device consisting of the driving and driven shafts, and pinions mounted on each shaft, gear casing members having lateral extensions to inclose said pinions, a bolt connecting the said casing members together, a sleeve journaled on said bolt and having its ends respectively extending into said casing members, said sleeve having shoulders formed thereon, a driving gear mounted upon each end of said sleeve and respectively held between a shoulder on said sleeve and the associated casing, said gears respectively meshing with said pinions, and an anti-friction ball bearing interposed between the meeting faces of said gear case sections.

5. A power transmitting device consisting of the driving and driven shafts each having a pinion, gear case sections having lateral extensions to inclose said pinions, a bolt extending axially through said gear case sections to clamp the same upon each other, gears carried by said bolt and respectively arranged within said gear case members to mesh with the associated pinions, said gear case members having laterally extending annular meeting flanges, flanged wearing plates forming the facings for said flanges, and anti-friction balls interposed between said wearing plates.

In testimony whereof I have hereunto set my hand in the presence of the subscribing witnesses, on this 28th day of February A. D., 1910.

CHARLES H. WARNER.

Witnesses:
H. W. ADAMS,
J. C. HOWELL.